Patented Mar. 17, 1931

1,797,179

UNITED STATES PATENT OFFICE

LORIN B. SEBRELL, OF AKRON, OHIO, ASSIGNOR TO THE GOODYEAR TIRE & RUBBER COMPANY, OF AKRON, OHIO, A CORPORATION OF OHIO

MANUFACTURE OF RUBBER COMPOSITIONS

No Drawing.    Application filed March 3, 1927.  Serial No. 172,557.

My invention relates to the manufacture of rubber compositions and it is directed specifically to a method of treatment that is devised for the purpose of prolonging the life of vulcanized rubber products.

The object of my invention is to improve the age-resisting properties of rubber compositions. This result is attained by associating therewith, either before or after the vulcanizing process, a class of reagents, hereafter to be described.

Organic materials including rubber are attacked by weathering agencies, such as light, heat and oxygen. The deleterious effects upon rubber produced by these agencies manifest themselves by a lowering of its tensile strength, and a reduction of its resistance to abrasion, as well as by the hardening, cracking and checking of the article.

For some time the value of the reaction products of certain aldehydes and amines as accelerators has been recognized. More recently, it has been observed that other compounds of this class, while having little or no value as accelerators, are very excellent antioxidants. The patent to Winkelman et al., No. 1,515,642, November 18, 1924, describes a few aldehyde-amine reaction products having this characteristic. This patent specifically mentions the following materials as being valuable for their antioxidant powers:

Furfuraldehyde-o-toluidine
Furfuraldehyde α naphthylamine
Butyaldehyde α naphthylamine
Acetaldehyde-o-toluidine I have discovered that anilido butylidene aniline and its homologues also impart desirable age-resisting properties to vulcanized rubber. These substances are usually prepared by the reaction of aldehydes and aromatic amines in a cold solution. Anilido butylidene aniline for instance is the reaction product of aniline and acetaldehyde. If the latter materials are permitted to react while exposed to an elevated temperature of about 140° C., an accelerator is produced. These latter compounds are the reaction products of aniline and the aldehydes that have heretofore been used in rubber compounding. The patent to Cadwell No. 1,417,970, May 30, 1922, in the paragraph beginning with line 89, page 1, describes such a method of preparing accelerators.

One method of preparing antioxidants from aldehydes and amines involves dissolving 370 cubic centimeters of fresly distilled aniline in a quantity of 95% alcohol and chilling the mixture to a temperature of about 0° C. It is then agitated mechanically while acetaldehyde, preferably of at least 95% purity, is added in 10 centimeter portions periodically until 225 cubic centimeters have been added over a period of an hour or more. After the reacting ingredients have thus been added, the reaction mixture, while maintained at the reduced temperature, is stirred for an additional half hour, during which a white crystalline product (M. P. 122° C.) collects, that is filtered off and dried.

If a few centimeters of water are then added to the filtrate a red viscous oil separates out, which is an isomer of the crystalline product, and which itself may be crystallized in the form of white needles (M. P. 86° C.), from a solvent, such as chloroform. The mechanics of the reaction by which the material is formed and the structure of the reaction product are indicated by the following structural formulas taken from Annalen, vol. 318, p. 69 (1901):

$$2C_6H_5NH_2 + 2CH_3CHO \longrightarrow$$

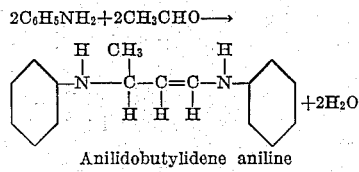

Anilidobutylidene aniline

This material is exemplary of a class of compounds that result from the reaction of amines and aldehydes. Its physical properties differ from the materials which have been employed by rubber chemists heretofore in that it is a crystalline material having a definite melting point. As it is to be expected, homologues of these materials are possible. For example, the anilido-hexylidene aniline of the formula:

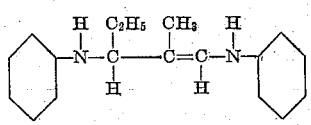

has been prepared from propylaldehyde and aniline in a manner analogous to that used in preparing the above materials and has similar properties. Other materials which fall within this genus include reaction products of various other homologues of aniline, and homologues of acetaldehyde.

When a small amount of the crystalline material is incorporated in a rubber mix, it imparts desirable age-resisting properties to the vulcanized product. To ascertain its value, two sets of test samples vulcanized for one hour at 40 pounds steam pressure and having the following ratio of ingredients were prepared:

- 100 parts rubber (acetone extracted)
- 5 parts zinc oxide
- 3 parts sulfur
- 0.5 part hexamethylene tetramine
- 1 part antioxidant.

The samples were then subjected to the action of air maintained at 70° C., one set of samples being exposed for six days and another twelve days. Tabulated below are the comparative tear values that were obtained from samples containing the antioxidants and from samples containing none. The results are clearly indicative of the ability of the compositions to render a vulcanized product resistant to the action of air maintained at a temperature of 70° C.

| Antioxidant | Tear values | | |
| --- | --- | --- | --- |
| | Original | 6 days | 12 days |
| None | 26 | 7 | 8 |
| Anilidohexilidene aniline | 31 | 22 | 20 |
| Anilidobutylidene aniline | 31 | 21 | 21 |

While but two compounds have been specifically set forth, and but a single method of preparing the compounds has been described, it will be apparent to those skilled in the art that the invention is not limited to the specific ingredients enumerated, the manner in which they are to be utilized in connection with the vulcanization of rubber, or the method by which they are produced, and I desire therefore that my invention be interpreted as restricted only by the prior art and the appended claim.

What I claim is:

A method of preserving rubber which comprises subjecting it to vulcanization in the presence of anildo hexilidene aniline.

In witness whereof, I have hereunto signed my name.

Signed at Akron, in the county of Summit, and State of Ohio, this 2nd day of March, 1927.

LORIN B. SEBRELL.